April 22, 1952 R. E. FOWLER 2,594,146
DEVICE FOR CONTROLLING THE FILLING OF CONTAINERS
Filed April 20, 1949 2 SHEETS—SHEET 1
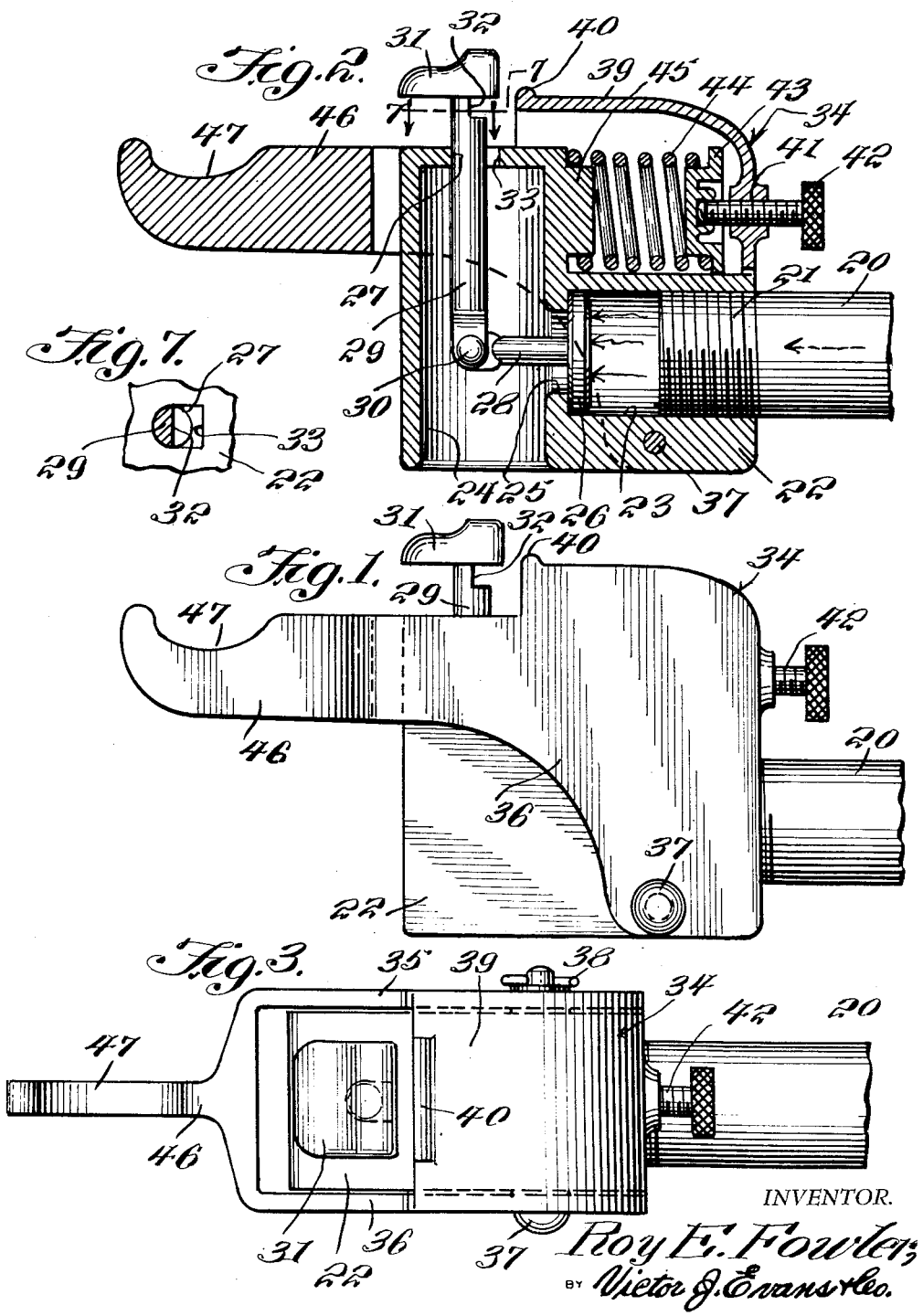
INVENTOR.
Roy E. Fowler,
BY Victor J. Evans & Co.
ATTORNEYS

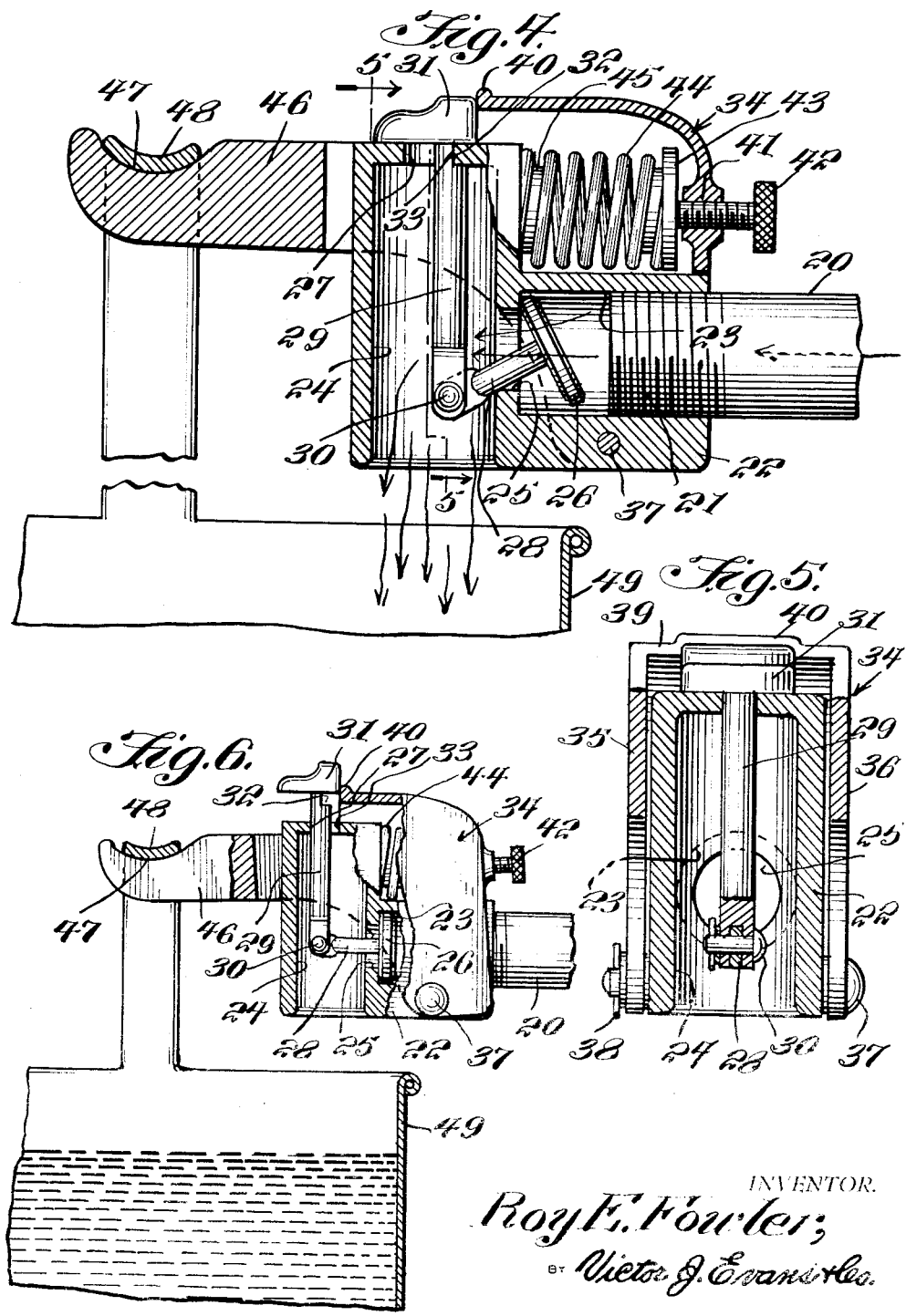

Patented Apr. 22, 1952

2,594,146

UNITED STATES PATENT OFFICE 2,594,146

DEVICE FOR CONTROLLING THE FILLING OF CONTAINERS

Roy E. Fowler, Watkinsville, Ga.

Application April 20, 1949, Serial No. 88,528

2 Claims. (Cl. 249—58)

1

This invention relates to a valve, and more particularly to a valve for controlling the filling of containers, such as buckets with fluid, such as water.

The object of the invention is to provide a valve which can be manually operated to control the flow of fluid into a receptacle.

Another object of the invention is to provide a valve which will automatically stop the flow of fluid into a container after the container has been filled with the desired amount of fluid.

Still another object of the invention is to provide a valve which can be used in lieu of a conventional water faucet and which is constructed without packings or threaded parts so that the device can be used for a long period of time without requiring repairs thereto.

A further object of the invention is to provide a valve which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a side elevational view of the valve, according to the present invention;

Figure 2 is a vertical longitudinal sectional view of the valve, showing the position of the parts thereof when the valve is closed;

Figure 3 is a top plan view of the device;

Figure 4 is a view similar to Figure 2, but showing the position of the parts when the valve is open;

Figure 5 is a sectional view taken on the line 5—5 of Figure 4;

Figure 6 is a side elevational view of the valve in closed position, with parts broken away and in section, and showing a bucket attached thereto and filled with water; and Figure 7 is a sectional view taken on the line 7—7 of Figure 2.

Referring in detail to the drawings, the numeral 20 designates a portion of a pipe for conveying fluid, such as water, from a source of supply. The pipe 20 has exterior threads, as at 21, for a portion of its length. A housing 22 is provided with a passageway 23 which is threaded interiorly for a portion of its length for threadably receiving the threaded portion 21 of the pipe 20.

The housing 22 is fabricated of any suitable material and is provided with a channelway 24 which is arranged at right angles with respect to

2 the passageway 23. A port 25 connects the passageway 23 to the channelway 24 and a valve head 26 is mounted for movement into and out of bridging relation with respect to the port 25 in order to control the flow of fluid therethrough as later described.

The upper end of the housing 22 is provided with an opening 27 which communicates with the channelway 24. A stem 28 has one end secured to the valve 26, and a rod 29 has its lower end pivotally connected to the stem 28 by means of a pin 30. Secured to the upper end of the rod 29 is a head 31, and the rod 29 is provided with a notch 32 adjacent its upper end for a purpose to be later described. The housing 22 is also provided with a lip 33 which is adapted to project or seat in the notch 32 for selectively maintaining the valve head 26 out of closing relation with respect to the port 25.

The device of the present invention also includes a saddle 34, which may be fabricated of any suitable material, and the saddle 34 is shaped to define a pair of spaced parallel side walls 35 and 36 which are arranged on opposite sides of the housing 22. A pin 37 projects through the side wall 36, through the housing 22, and through the other side wall 35 whereby a pivotal connection is provided between the saddle 34 and the housing 22. A cotter pin 38 projects through the end of the pin 37 for maintaining the parts in assembled relation.

The saddle 34 further includes a top portion 39 which is provided with an ear 40 that is adapted to contact the head 31 in order to cause the valve head 26 to close the port 25 as later described. Arranged in threaded engagement with an interiorly threaded aperture 41 in the rear portion of the saddle 34 is an adjusting screw 42. The inner end of the adjusting screw 42 is arranged in engagement with a bushing 43. A coil spring 44 has one of its ends arranged in engagement with a shoulder 45 which is integral with or projects from the housing 22, while the other end of the coil spring 44 is arranged in engagement with the housing 43.

The saddle 34 is also provided with an actuating lever 46 which is provided with a cut-out 47 for receiving a handle 48 of a bucket or container 49 to be filled with fluid, such as water.

The valve is adapted to be used in lieu of a conventional water faucet and when so used can be manually operated to control the flow of water therethrough. Thus, when the valve is being manually operated, the user depresses the rod 29 until the notch 32 is in engagement with the lip 33. This downward movement of the rod 29 causes the valve head 26 to be moved out of engagement with the port 25. In other words, the various parts of the valve are moved from the position shown in Figure 2 to the position shown in Figure 4 so that fluid, such as water, flows through the pipe 20, then through the port 25 in the direction of the arrows, then through the lower open end of the channelway 24 and into the bucket 49 being filled. To manually stop the flow of water into the bucket 49, the user moves the rod 29 so that its notch 32 is out of engagement with the lip 33 and this will allow the valve head 26 to again bridge or close the port 25 so that the flow of water into the bucket 49 will be prevented.

When the device is to be used for automatically filling the bucket 49 with water, the handle 48 of the bucket 49 is suspended from the lever 46. Then, the lever 29 is depressed manually until the notch 32 receives the lip 33 so that the valve 26 will be out of closing relation with respect to the port 25. Thus, water will flow through the pipe 20, through the port 25, and into the bucket 49 as shown in Figure 4. As the bucket 49 becomes filled with this water, the saddle 34 will be pivoted about the pin 37 and at the same time the spring 44 will be compressed. As the container 49 gradually gets filled with water, the lip 40 of the saddle 34 will contact the head 31 which is secured to the upper end of the rod 29. Finally the weight of the water in the bucket 49 will be sufficient to pivot the saddle 34 against the spring 44 and the lip 40 will have moved the head 31 so that the valve head 26 will close the port 25. The valve head 26 will be closed by the incoming water, as shown in Figure 6. The adjusting screw 42 can be regulated in order to vary the tension on the spring 44 so that the device can be adjusted so the valve head 26 will not close until the desired quantity of water has entered the bucket 49.

From the foregoing, it will be apparent that a device has been provided which is useful in filling containers, and which is constructed so that the flow of fluid therethrough can be stopped either manually or automatically. The device is equally useful in filling water buckets of the type used in service stations for filling automobile radiators.

While I have shown and described a specific embodiment of my invention, this is by way of illustration only and I consider as my own all such modifications in construction as fairly fall within the scope of the appended claims.

What I claim:

1. In a device for controlling the flow of fluid into a container, a housing provided for the passageway for the egress therethrough of fluid, said housing having a channelway arranged at right angles with respect to said passageway, there being a port connecting said passageway to said channelway, a valve head mounted for movement into and out of bridging relation with respect to said port, a stem having one end secured to said valve head, a rod pivotally connected to the other end of said stem and projecting through said channelway, a head secured to the upper end of said rod, a saddle mounted for movement into and out of engagement with said head, resilient means interposed between said saddle and housing, and an actuating lever projecting from said saddle, said saddle being shaped to define a pair of spaced parallel side walls, said side walls being arranged on opposite sides of said housing, a pivot pin projecting through said side walls and through said housing, said saddle including a top portion provided with an ear adapted to contact said head to thereby cause said valve head to close said port.

2. In a device for controlling the flow of fluid into a container, a housing provided with a passageway for the egress therethrough of fluid, said housing having a channelway arranged at right angles with respect to said passageway, there being a port connecting said passageway to said channelway, a valve head mounted for movement into and out of bridging relation with respect to said port, a stem having one end secured to said valve head, a rod pivotally connected to the other end of said stem and projecting through said channelway, a head secured to the upper end of said rod, a saddle mounted for movement into and out of engagement with said head, resilient means interposed between said saddle and housing, and an actuating lever projecting from said saddle, said saddle being shaped to define a pair of spaced parallel side walls, said side walls being arranged on opposite sides of said housing, a pivot pin projecting through said side walls and through said housing, said saddle including a top portion provided with an ear adapted to contact said head to thereby cause said valve head to close said port, said actuating lever being provided with a cutout for receiving therein the handle of a bucket.

ROY E. FOWLER.

REFERENCES CITED

The following references are of record in the file of this patent:

UNITED STATES PATENTS

| Number | Name | Date |
|---|---|---|
| 1,513,038 | Fortier et al. | Oct. 28, 1924 |